(12) United States Patent
Jadran et al.

(10) Patent No.: US 6,241,794 B1
(45) Date of Patent: Jun. 5, 2001

(54) MINIVENT AIR FILTER

(76) Inventors: Mohammad N. Jadran; Jeanie Jadran, both of 238 Harvard La., Bloomingdale, IL (US) 60108

( * ) Notice: Subject to any disclaimer, the term of this patent is extended or adjusted under 35 U.S.C. 154(b) by 0 days.

(21) Appl. No.: 09/301,737

(22) Filed: Apr. 29, 1999

(51) Int. Cl.$^7$ ............................................. B01D 25/00
(52) U.S. Cl. ..................... 55/490; 55/480; 55/481; 55/492; 55/493; 55/506; 55/508; 55/511; 55/DIG. 31; 55/DIG. 35
(58) Field of Search .................... 55/480, 481, 492, 55/493, 508, 511, DIG. 31, DIG. 35, 506, 490; 454/247, 289, 330, 331

(56) References Cited

U.S. PATENT DOCUMENTS

| | | | |
|---|---|---|---|
| 4,334,189 | * | 6/1982 | McConnell ..................... 55/DIG. 35 |
| 5,176,570 | * | 1/1993 | Liedl ............................... 55/DIG. 30 |
| 5,240,487 | * | 8/1993 | Kung ............................... 55/DIG. 35 |
| 5,462,569 | * | 10/1995 | Benjamin ....................... 55/DIG. 31 |
| 5,525,145 | * | 6/1996 | Hodge ............................ 55/DIG. 31 |
| 5,597,392 | * | 1/1997 | Hawkins et al. ............... 55/DIG. 35 |
| 5,690,719 | * | 11/1997 | Hodge ............................ 55/DIG. 35 |
| 5,707,411 | * | 1/1998 | Rodaway et al. .............. 55/DIG. 35 |
| 5,776,218 | * | 7/1998 | Enns ............................... 55/DIG. 35 |
| 5,792,230 | * | 8/1998 | Moore et al. ................... 55/DIG. 35 |
| 5,863,310 | * | 1/1999 | Brown et al. .................. 55/DIG. 31 |
| 6,030,427 | * | 2/2000 | Sorice et al. ................... 55/DIG. 31 |

* cited by examiner

Primary Examiner—David A. Simmons
Assistant Examiner—Minh-Chau T. Pham

(57) ABSTRACT

A minivent air filter for filtering air passing through a vent in a force air system to remove dust and other particulate matter from the passing air. The minivent air filter includes a vent cover and a tubular vent sleeve in communication with the vent cover. The vent sleeve has a elongate slot. A pair of support rails are disposed in the vent sleeve below the elongate slot. A filter is inserted through the elongate slot into the vent sleeve.

14 Claims, 3 Drawing Sheets

MINIVENT AIR FILTER

BACKGROUND OF THE INVENTION

1. Field of the Invention

The present invention relates to forced air vent filters and more particularly pertains to a new minivent air filter for filtering air passing through a vent in a force air system to remove dust and other particulate matter from the passing air.

2. Description of the Prior Art

The use of forced air vent filters is known in the prior art. More specifically, forced air vent filters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. Nos. 4,961,849; 5,100,445; 5,399,180; 5,597,392; and 5,679,121.

While these devices fulfill their respective, particular objectives and requirements, the aforementioned patents do not disclose a new minivent air filter. The inventive device includes a vent cover and a tubular vent sleeve in communication with the vent cover. The vent sleeve has a elongate slot. A pair of support rails are disposed in the vent sleeve below the elongate slot. A filter is inserted through the elongate slot into the vent sleeve.

In these respects, the minivent air filter according to the present invention substantially departs from the conventional concepts and designs of the prior art, and in so doing provides an apparatus primarily developed for the purpose of filtering air passing through a vent in a force air system to remove dust and other particulate matter from the passing air.

SUMMARY OF THE INVENTION

In view of the foregoing disadvantages inherent in the known types of forced air vent filters now present in the prior art, the present invention provides a new minivent air filter construction wherein the same can be utilized for filtering air passing through a vent in a force air system to remove dust and other particulate matter from the passing air.

The general purpose of the present invention, which will be described subsequently in greater detail, is to provide a new minivent air filter apparatus and method which has many of the advantages of the forced air vent filters mentioned heretofore and many novel features that result in a new minivent air filter which is not anticipated, rendered obvious, suggested, or even implied by any of the prior art forced air vent filters, either alone or in any combination thereof.

To attain this, the present invention generally comprises a vent cover and a tubular vent sleeve in communication with the vent cover. The vent sleeve has a elongate slot. A pair of support rails are disposed in the vent sleeve below the elongate slot. A filter is inserted through the elongate slot into the vent sleeve.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new minivent air filter apparatus and method which has many of the advantages of the forced air vent filters mentioned heretofore and many novel features that result in a new minivent air filter which is not anticipated, rendered obvious, suggested, or even implied by any of the prior art forced air vent filters, either alone or in any combination thereof.

It is another object of the present invention to provide a new minivent air filter which may be easily and efficiently manufactured and marketed.

It is a further object of the present invention to provide a new minivent air filter which is of a durable and reliable construction.

An even further object of the present invention is to provide a new minivent air filter which is susceptible of a low cost of manufacture with regard to both materials and labor, and which accordingly is then susceptible of low prices of sale to the consuming public, thereby making such minivent air filter economically available to the buying public.

Still yet another object of the present invention is to provide a new minivent air filter which provides in the apparatuses and methods of the prior art some of the advantages thereof, while simultaneously overcoming some of the disadvantages normally associated therewith.

Still another object of the present invention is to provide a new minivent air filter for filtering air passing through a vent in a force air system to remove dust and other particulate matter from the passing air.

Yet another object of the present invention is to provide a new minivent air filter which includes a vent cover and a tubular vent sleeve in communication with the vent cover. The vent sleeve has a elongate slot. A pair of support rails are disposed in the vent sleeve below the elongate slot. A filter is inserted through the elongate slot into the vent sleeve.

Still yet another object of the present invention is to provide a new minivent air filter that may be used on floor vents, wall vents and even air intake vents of a forced air system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
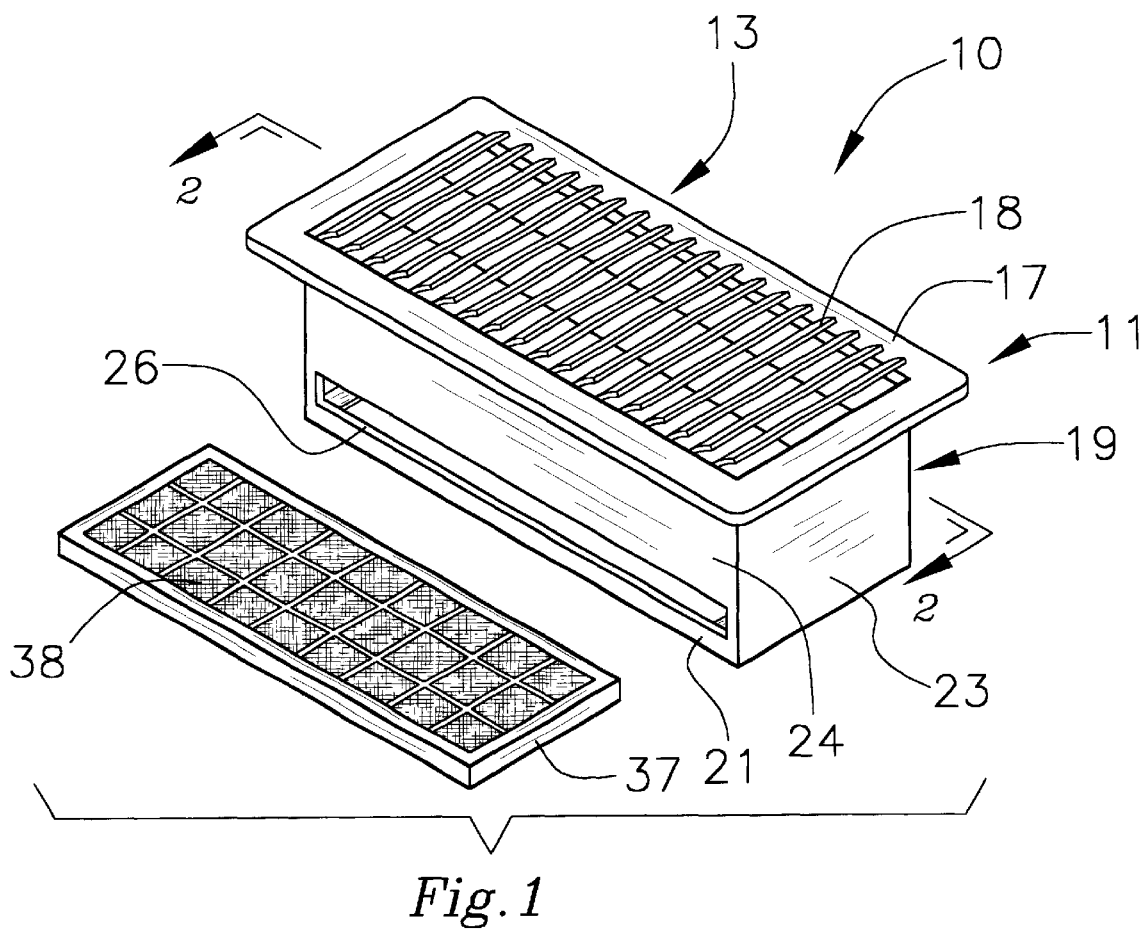
FIG. 1 is a schematic exploded perspective view of a new minivent air filter according to the present invention.

With reference now to the drawings, and in particular to FIGS. 1 through 6 thereof, a new minivent air filter embodying the principles and concepts of the present invention and generally designated by the reference numeral 10 will be described.

As best illustrated in FIGS. 1 through 6, the minivent air filter 10 generally comprises a vent cover and a tubular vent sleeve in communication with the vent cover. The vent sleeve has a elongate slot. A pair of support rails are disposed in the vent sleeve below the elongate slot. A filter is inserted through the elongate slot into the vent sleeve.

In use, the minivent air filter system 10 is designed for a vent of a forced air system (commonly known as a central air system) having a duct in communication with the forced air system. The duct has an opening 11 (commonly known as a register) in a floor or wall structure 12.

The air filter system comprises a vent cover 13 having a generally rectangular perimeter side wall 14 with upper and lower edges 15,16, and a generally rectangular top flange 17 outwardly extending around the upper edge of the perimeter side wall of the vent cover. The top flange and the upper edge of the vent cover lie in a common plane with one another substantially parallel to a plane in which the lower edge of the vent cover lies. The upper edge of the perimeter side wall of the vent cover defines a generally rectangular upper opening of the vent cover and the lower edge of the perimeter side wall of the vent cover defining a generally rectangular lower opening of the vent cover. Typically, the vent cover has a plurality of spaced apart and substantially parallel louvers 18 extending across the upper opening of the vent cover.

The system also includes a vent sleeve 19 having a generally rectangular outer configuration comprising generally rectangular upper and lower edges 20,21, a pair of substantially parallel end walls 22,23, and a pair of substantially parallel side walls 24,25 extending substantially perpendicular to the end walls of the vent sleeve. The upper and lower edges of the vent sleeve lie in substantially parallel planes with one another. The upper edge of the vent sleeve defining an upper opening of the vent sleeve and the lower edge of the vent sleeve defining a lower opening of the vent sleeve.

Figure 2:
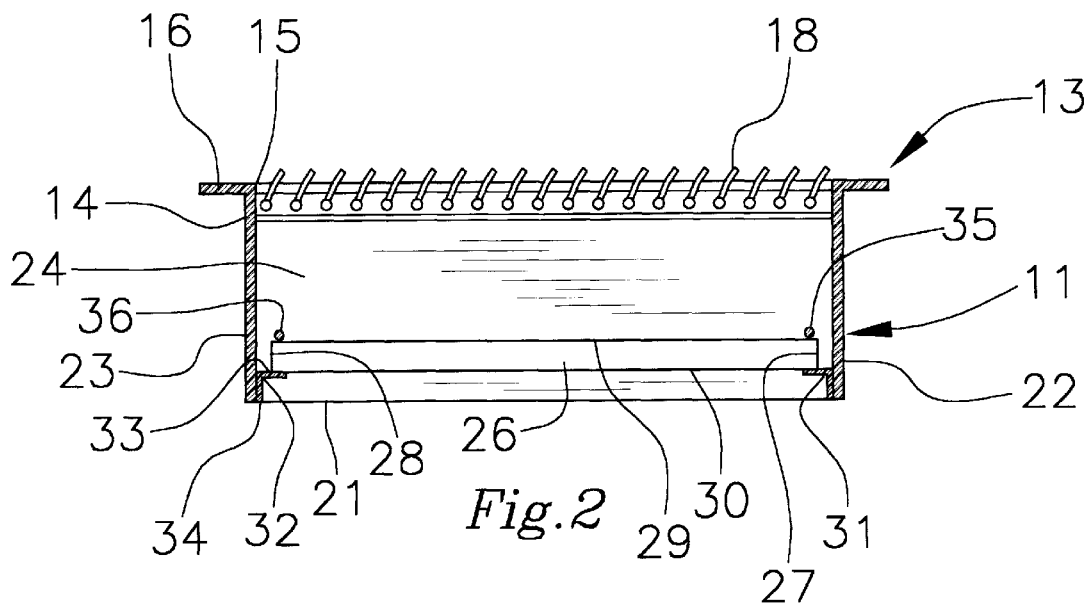
FIG. 2 is a schematic cross sectional view of the present invention taken from line 2—2 of FIG. 1.
Figure 5:
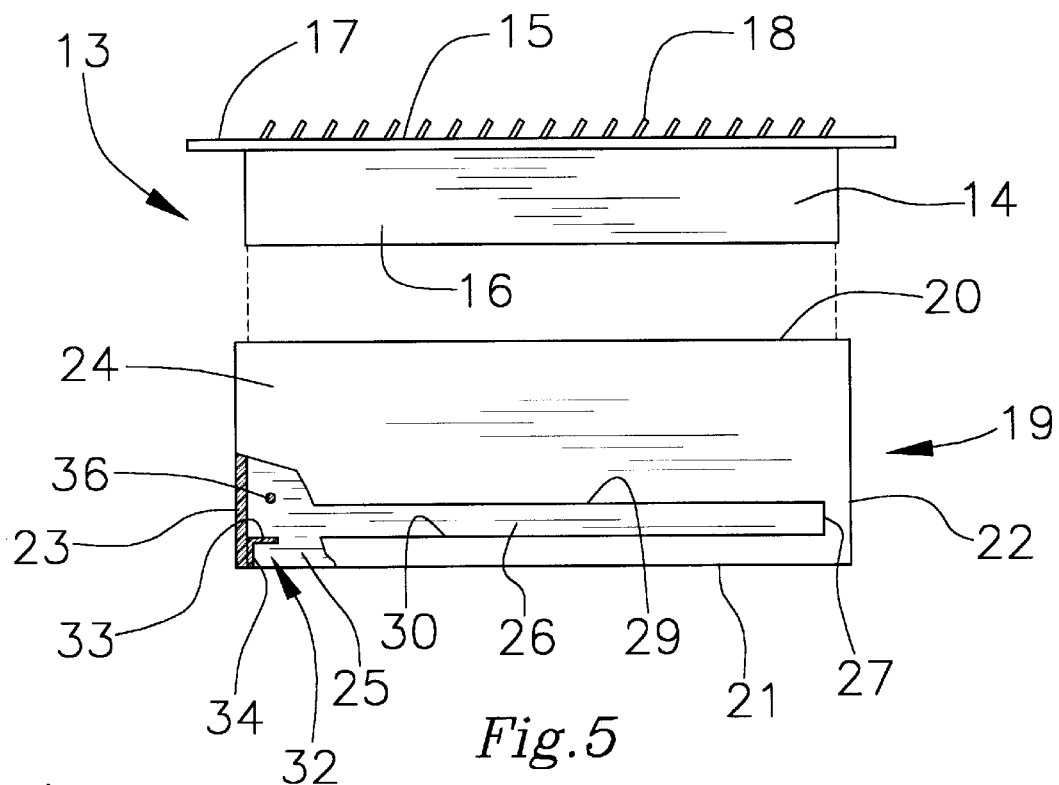
FIG. 5 is a schematic breakaway exploded side view of another embodiment of the present invention.

In one preferred embodiment, as illustrated in FIG. 5, the perimeter side wall of the vent cover is inserted into the upper opening of the vent sleeve such that the air may pass through the vent sleeve and the vent cover. With reference to FIG. 2, in another preferred embodiment, the lower edge of the perimeter side wall of the vent cover is integrally coupled to the upper edge of the vent sleeve.

The vent sleeve has a generally rectangular elongate slot 26 in one of the side walls of the vent sleeve and positioned towards the lower edge of the vent cover. The elongate slot has a spaced apart pair of substantially parallel end edges 27,28 and spaced apart and substantially parallel top and bottom edges 29,30 extending substantially perpendicular to the end edge of the elongate slot. The top and bottom edges of the elongate slot lie in planes substantially parallel to the lower edge of the vent sleeve.

A pair of substantially parallel support rails 31,32 are disposed in the vent sleeve and extending between the side walls of the vent sleeve. One of the support rails is coupled to one of the end walls of the vent sleeve and the other of the support rails is coupled to the other of the end walls of the vent sleeve. The support rails each have a generally inverted L-shaped transverse cross section defining upper and lower portions 33,34 of the respective support rail. The upper and lower portions of each support rail are extended substantially perpendicular to one another. The lower portion 34 of each support rail is coupled to the associated adjacent end wall of the vent sleeve. The upper portions 33 of the support rails lie in a common plane substantially parallel to a plane in which the lower edge of the vent sleeve lies. The common plane of the upper portions of the support rails is positioned adjacently below the bottom edge of the elongate slot.

Preferably, a spaced apart pair of substantially parallel support rods 35,36 are also disposed in the vent sleeve and extending between the side walls of the vent sleeve. One of the support rods is positioned towards one of the end walls of the vent sleeve and the other of the support rods is positioned towards the other of the end walls of the vent sleeve. The support rods lie in a common plane with one another substantially parallel to the plane in which the lower edge of the vent sleeve lies. The common plane of the support rods is positioned adjacently above the top edge of the elongate slot.

A planar filter 37 has a generally rectangular outer perimeter with or without an outer frame, upper and lower faces 38,39, and comprises a filtration material has a plurality of apertures or pores of a predetermined size extending therethrough between the upper and lower faces of the filter for preventing passage therethrough of dust and particulate matter greater than the predetermined size of the apertures. The filter is inserted through the elongate slot into the vent sleeve so that the filter is interposed between the upper portions of the support rails and the support rods which help to hold the filter in place in the vent sleeve. The filter substantially blocks free passage through the vent sleeve between the upper and lower openings of the vent sleeve without passage through the filter such that air passing through the vent sleeve passes through the apertures of the filter.

Figure 3:
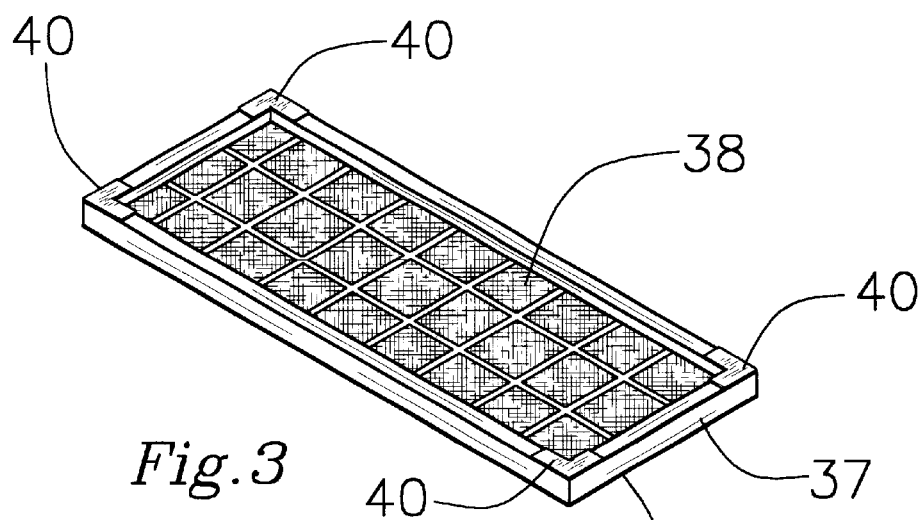
FIG. 3 is a schematic perspective view of a filter with adhesive strips thereon.
Figure 4:
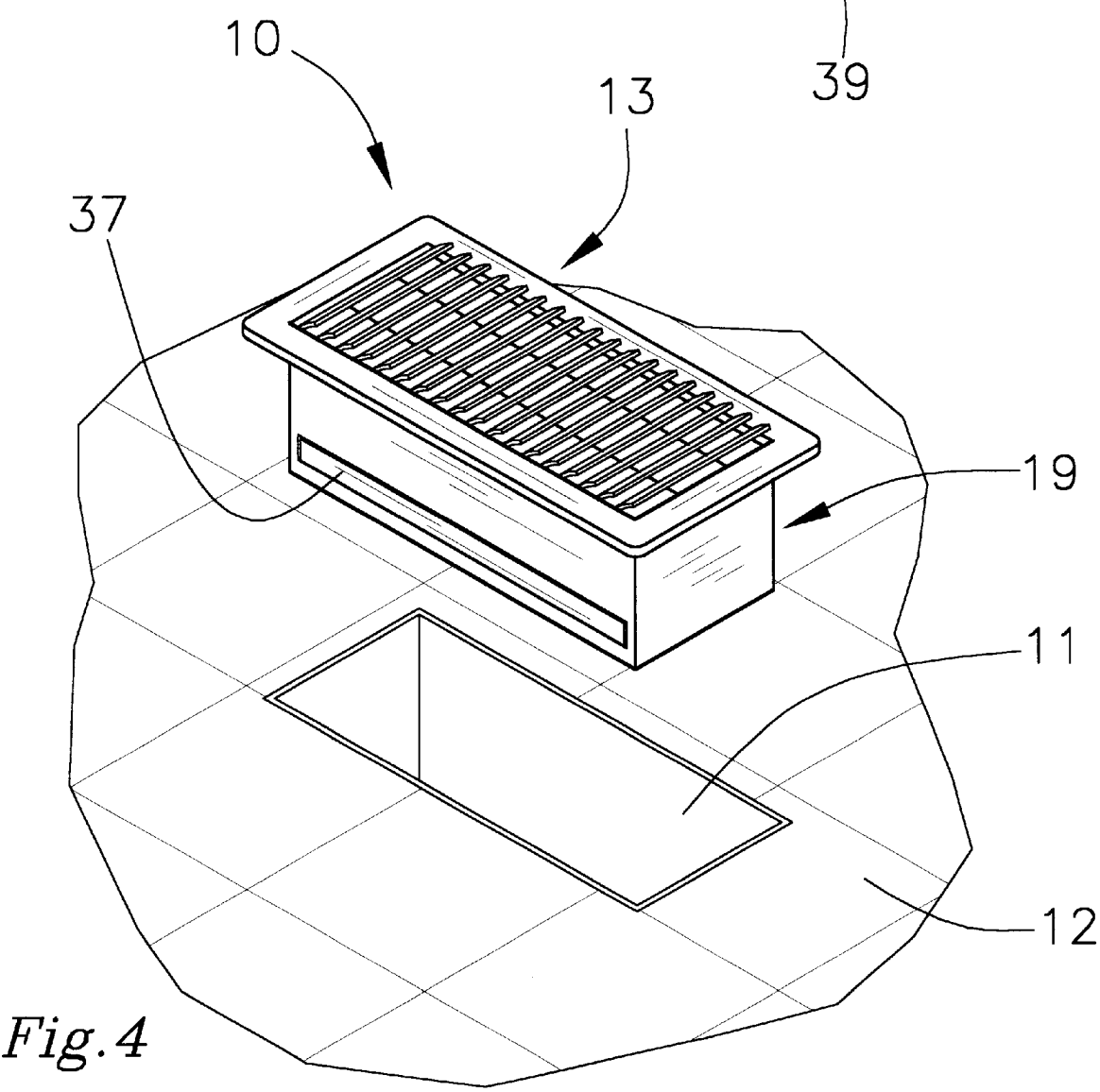
FIG. 4 is a schematic exploded perspective view of the present invention in use.

Optionally, as illustrated in FIG. 3, the upper face of the filter may have a plurality of adhesive strips 40 provided thereon along the outer perimeter of the filter. The adhesive strips are designed for adhesively coupling to the lower edge of the perimeter side wall of a vent cover so that the filter blocks free passage through the lower opening of the vent cover so that the vent sleeve is not needed.

Figure 6:
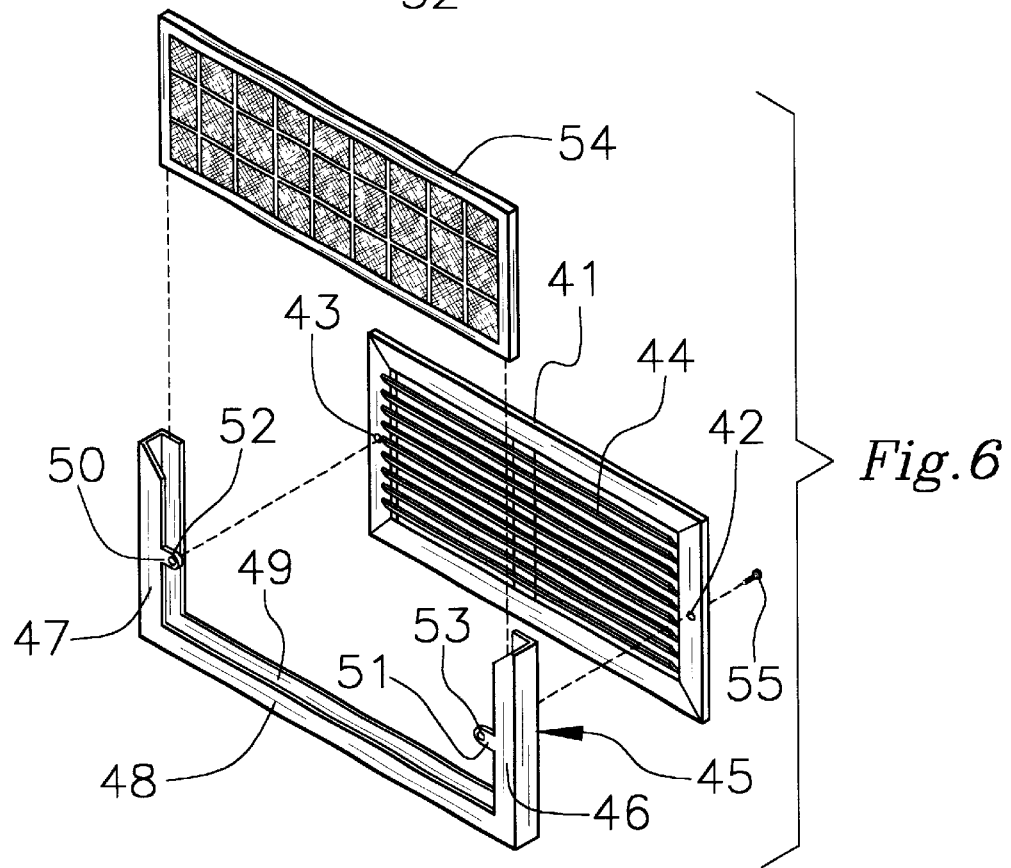
FIG. 6 is a schematic exploded perspective view of the air return cover embodiment of the present invention.

With reference to FIG. 6, the filtration system may also be used for an air return duct in communication with a forced air system having a generally rectangular air return cover 41 with a pair of mounting holes 42,43 and a louvered central opening 44 therethrough. In this embodiment, a generally rectangular-U-shaped frame 45 is provided having a pair of side members 46,47, a lower member 48 connecting the side members together, and an upper channel 49 extending along the side members and the lower member.

Each of the side members of the frame has an inwardly extending mounting tab 50,51 extending towards one another. Each of the mounting tabs has a mounting hole 52,53. The frame is positioned adjacent the air return cover with one of the mounting holes of the mounting tab is coaxially aligned with one of the mounting holes of the air return cover and the other of the mounting holes of the mounting tab is coaxially aligned with the other of the mounting holes of the air return cover.

A planar second filter 54 having a generally rectangular outer perimeter with or without an outer frame, upper and lower faces, and comprises a filtration material has a plurality of apertures or pores of a predetermined size extending therethrough between the upper and lower faces of the second filter for preventing passage therethrough of dust and particulate matter greater than the predetermined size of the apertures. The second filter is inserted into the channel of the frame so that the second filter substantially covers a rear face of the air return cover such that air passing through the air return cover passes through the filter.

The air return cover covering the opening of the air return duct such that the frame and the second filter are interposed between the air return cover and the opening of the air return duct. A fastener 55 is extended through each associated pair of mounting holes of the air return cover and the mounting tabs and into the structure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A filtration system for a vent of a forced air system, comprising:

a vent cover having a perimeter side wall having upper and lower edges, and a top flange outwardly extending around said upper edge of said perimeter side wall of said vent cover, said lower edge of said vent cover defining a lower opening of said vent cover;

a vent sleeve having upper and lower edges, said upper edge of said vent sleeve defining an upper opening of said vent sleeve and said lower edge of said vent sleeve defining a lower opening of said vent sleeve;

said lower opening of said vent cover being in communication with said upper opening of said vent sleeve;

said vent sleeve having an elongate slot;

a pair of support rails being disposed in said vent sleeve below said elongate slot;

a filter having a plurality of apertures of a predetermined size for preventing passage therethrough of particulate matter greater than said predetermined size of said apertures;

said filter being inserted through said elongate slot into said vent sleeve; and a spaced apart pair of support rods being disposed in said vent sleeve above said elongate slot, each of said support rods being spaced front said one of said support rails a distance substantially equal to a thickness of said filter such that said support rods hold said filter against said support rails removably securing the filter in the sleeve.

2. The filtration system of claim 1, wherein said vent cover has a plurality of spaced apart and substantially parallel louvers extending across an upper opening of said vent cover defined by said upper edge of said vent cover.

3. The filtration system of claim 1, wherein said perimeter side wall of said vent cover is inserted into said upper opening of said vent sleeve.

4. The filtration system of claim 1, wherein said lower edge of said perimeter side wall of said vent cover is integrally coupled to said upper edge of said vent sleeve.

5. A filtration system for a vent of a forced air system, comprising:

a duct in communication with a forced air system, said duct having an opening in a structure;

a vent cover having a generally rectangular perimeter side wall having upper and lower edges, and a generally rectangular top flange outwardly extending around said upper edge of said perimeter side wall of said vent cover;

said top flange and said upper edge of said vent cover lying in a common plane with one another substantially parallel to a plane in which said lower edge of said vent cover lies;

said upper edge of said perimeter side wall of said vent cover defining a generally rectangular upper opening of said vent cover and said lower edge of said perimeter side wall of said vent cover defining a generally rectangular lower opening of said vent cover;

said vent cover having a plurality of spaced apart and substantially parallel louvers extending across said upper opening of said vent cover;

a vent sleeve having a generally rectangular outer configuration comprising generally rectangular upper and lower edges, a pair of substantially parallel end walls, and a pair of substantially parallel side walls extending substantially perpendicular to said end walls of said vent sleeve;

said upper and lower edges of said vent sleeve lying in substantially parallel planes with one another, said upper edge of said vent sleeve defining an upper opening of said vent sleeve and said lower edge of said vent sleeve defining a lower opening of said vent sleeve;

said perimeter side wall of said vent cover being inserted into said upper opening of said vent sleeve;

said vent sleeve having a generally rectangular elongate slot in one of said side walls of said vent sleeve and positioned towards said lower edge of said vent cover;

said elongate slot having a spaced apart pair of substantially parallel end edges and spaced apart and substantially parallel top and bottom edges extending substantially perpendicular to said end edge of said elongate slot;

said top and bottom edges of said elongate slot lying in planes substantially parallel to said lower edge of said vent sleeve;

a pair of substantially parallel support rails being disposed in said vent sleeve and extending between said side walls of said vent sleeve, one of said support rails being coupled to one of said end walls of said vent sleeve and the other of said support rails being coupled to the other of said end walls of said vent sleeve;

said support rails each having a generally inverted L-shaped transverse cross section defining upper and lower portions of the respective support rail, said upper and lower portions of each support rail being extended substantially perpendicular to one another;

said lower portion of each support rail being coupled to the associated adjacent end wall of said vent sleeve, said upper portions of said support rails lying in a common plane substantially parallel to a plane in which said lower edge of said vent sleeve lies;

said common plane of said upper portions of said support rails being positioned adjacently below said bottom edge of said elongate slot;

a spaced apart pair of substantially parallel support rods being disposed in said vent sleeve and extending between said side walls of said vent sleeve, one of said support rods being positioned towards one of said end walls of said vent sleeve and the other of said support rods being positioned towards the other of said end walls of said vent sleeve;

said support rods lying in a common plane with one another substantially parallel to said plane in which said lower edge of said vent sleeve lies;

said common plane of said support rods being positioned adjacently above said top edge of said elongate slot;

a planar filter having a generally rectangular outer perimeter, upper and lower faces, and a plurality of apertures of a predetermined size extending therethrough between said upper and lower faces of said filter for preventing passage therethrough of particulate matter greater than said predetermined size of said apertures;

said filter being inserted through said elongate slot into said vent sleeve, said filter being interposed between said upper portions of said support rails and said support rods; and said filter substantially blocking free passage through said vent sleeve between said upper and lower openings of said vent sleeve such that air passing through said vent sleeve passes through said apertures of said filter.

6. A filter for use with an air return duct in communication with a forced air system and generally having a rectangular opening known as a register, the filter system comprising:

a generally rectangular air return cover;

a generally rectangular-U-shaped frame, the frame having a pair of side members, a lower member connecting said side members together, said side members and said lower member each comprising a channel for receiving an edge of a filter;

each of said side members of said frame having an inwardly extending mounting tab, said mounting tabs extending towards one another, each of said mounting tabs having a mounting hole;

a planar filter slidably mounted in said frame permitting removal of said filter from said frame; and a plurality of fasteners for coupling the air return cover and mounting tabs on the frame.

7. The filter system of claim 6, wherein the air return cover has a pair of mounting holes and a louvered central opening therethrough.

8. The filter system of claim 6, wherein said frame being positioned adjacent to said air return cover.

9. The filter system of claim 6, wherein one of said mounting holes of said mounting tab being coaxially aligned with one of said mounting holes of said air return cover and the other of said mounting holes of said mounting tab being coaxially aligned with the other of said mounting holes of said air return cover.

10. The filter system of claim 6, wherein the filter has a generally rectangular outer perimeter with or without an outer frame, upper and lower faces.

11. The filter system of claim 6, wherein the filter comprises a filtration material having a plurality of apertures or pores of a predetermined size extending therethrough between said upper and lower faces of said second filter for preventing passage therethrough of dust and particulate matter greater than said predetermined size of said apertures, said filter being inserted into said channel of said frame.

12. The filter system of claim 6, wherein said filter substantially covers a rear face of said air return cover such that air passing through said air return cover passes through said filter.

13. The filter system of claim 6, wherein said air return cover covers said opening of said air return duct such that said frame and said filter are interposed between said air return cover and said opening of said air return duct.

14. The filter system of claim 6, wherein each fastener being extended through each associated pair of mounting holes of said air return cover and said mounting tab and into the structure.

* * * * *